(12) United States Patent
Wacke

(10) Patent No.: US 6,401,491 B1
(45) Date of Patent: Jun. 11, 2002

(54) FINAL BLOW/FINISH COOLING VALVE FUNCTION MONITOR

(75) Inventor: Robert S. Wacke, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/552,365

(22) Filed: Apr. 19, 2000

(51) Int. Cl.$^7$ ................................. C03B 9/00
(52) U.S. Cl. .................. 65/301; 65/29.1; 65/29.11; 65/29.15; 65/29.12; 65/82; 65/83; 65/85; 65/261; 65/265; 65/267; 65/300; 264/40.3; 264/40.5; 425/149; 425/526; 425/535
(58) Field of Search .................. 65/29.1, 29.11, 65/29.15, 29.12, 82, 83, 84, 85, 261, 262, 265, 267, 300, 301, 160; 264/40.3, 40.5; 425/149, 526, 535

(56) References Cited

U.S. PATENT DOCUMENTS

| | | | |
|---|---|---|---|
| 2,627,702 A | * | 2/1953 | Lowe .................... 65/300 |
| 3,236,620 A | | 2/1966 | Wiley |
| 3,281,230 A | | 10/1966 | Lyon |
| 3,407,055 A | | 10/1968 | Argyle |
| 3,779,731 A | | 12/1973 | Pollock et al. |
| 3,865,912 A | | 2/1975 | Rosenkranz et al. |
| 4,042,657 A | * | 8/1977 | Ostapchenko et al. ..... 264/40.3 |
| 4,362,544 A | | 12/1982 | Mallory |
| 4,615,722 A | | 10/1986 | Steffan et al. |
| 4,678,494 A | | 7/1987 | Nebelung et al. |
| 4,726,833 A | | 2/1988 | Foster |
| 5,007,817 A | | 4/1991 | Wallis |
| 5,244,610 A | | 9/1993 | Kitzmiller |
| 5,542,835 A | | 8/1996 | Kennedy et al. |
| 5,580,366 A | | 12/1996 | Farkas et al. |
| 5,902,527 A | | 5/1999 | Flood |

* cited by examiner

Primary Examiner—Michael Colaianni

(57) ABSTRACT

Apparatus for monitoring application of air through a dual-stage blowhead to blow mold a container includes a first solenoid valve for applying final blow air through the blowhead to a container in a mold and a second solenoid valve for applying finish cooling air through the blowhead around the finish of the container in the mold. Electronic circuitry is coupled to the first and second solenoid valves for detecting timing of application of first and second electrical valve control signals to the valves. Air pressure sensors are operatively coupled to the first and second solenoid valves for generating associated electrical signals indicative of timing of application of air by the first and second solenoid valves to the blowhead. Electronic compare logic is responsive to the timing of the valve control signals relative to the sensor signals for indicating operating condition of the valves, preferably by comparing timing of the valve control signals to timing of the sensor signals to indicate malfunction or potential malfunction at the valves.

6 Claims, 2 Drawing Sheets

FINAL BLOW/FINISH COOLING VALVE FUNCTION MONITOR

The present invention is directed to manufacture of glassware, and more particularly to a method and apparatus for monitoring the functions of solenoid valves for applying final blow and finish cooling air through a dual-stage blowhead in the final blow operation of a glassware manufacturing machine.

BACKGROUND AND OBJECTS OF THE INVENTION

Glassware, such as glass bottles, is typically made in a so-called individual section machine, which includes a plurality of identical sections that operate in synchronism and out of phase with each other to produce the glassware. Each section includes one or more blank molds, in which gobs of molten glass are either pressed or blown to form parisons. Each parison is then moved from the blank mold and placed in a final blow mold. A blowhead is lowered over the parison in the blow mold, and final blow air is directed into the parison through the blowhead to form the parison against the internal surface of the final blow mold. Conventional blowheads thus include an air passage for applying final blow air from an inlet to the inside of the parison. In dual-stage blowheads, also sometimes called isolated finish-cooled blowheads, finish cooling air is applied separately from the final blow air to cool the exterior surface of the container finish during application of final blow air and to prevent distortion of the finish under final blow pressure. Application of final blow air and finish cooling air in each machine section is controlled by an associated solenoid valve, which is responsive to valve control signals from machine timing electronics to apply final blow or finish cooling air to all blowheads in a machine section.

It is important in control of air-driven operations in a glassware manufacturing machine, including particularly application of final blow and finish cooling air through a dual-stage blowhead, to monitor operation of the solenoid valves to ensure that the air is being applied at the desired times relative to the valve control signals. This is conventionally accomplished by provision of multiple air pressure gauges at both ends of the glassware manufacturing machine, which must be monitored by the machine operating personnel. It is a general object of the present invention to provide an apparatus and method for electronically monitoring application of air (above or below atmospheric pressure) in a glassware manufacturing machine, including specifically application of final blow and finish cooling air to the dual-stage blockheads of each machine section, which automatically and electronically monitor timing of air application relative to the associated valve control signals for indicating operating condition of the various solenoid valves and detecting malfunction or impending malfunction at one or more of the solenoid valves.

SUMMARY OF THE INVENTION

Apparatus for monitoring application of air through a dual-stage blowhead to blow mold a container in a presently preferred implementation of the invention includes a first solenoid valve for applying final blow air through the blowhead to a container in a mold and a second solenoid valve for applying finish cooling air through the blowhead around the finish of the container in the mold. Electronic circuitry is coupled to the first and second solenoid valves for detecting the timing of application of first and second electrical valve control signals to the valves. Air pressure sensors are operatively coupled to the first and second solenoid valves for generating associated electrical sensor signals indicative of the timing of application of air by the first and second solenoid valves to the blowhead. Electronic compare logic is responsive to the timing of the valve control signals and the sensor signals for indicating operating condition of the valves, preferably by comparing timing of the valve control signals to timing of the sensor signals to indicate malfunction or potential malfunction at the valves. Potential malfunction at the valves may include failure of one or both of the valves to apply air responsive to the associated control signals, late operation of one or both valves to apply air responsive to the control signals, failure of one or both valves to terminate application of air responsive to the control signals, and late operation of one or both valves to terminate application of air responsive to the control signals.

A method of monitoring application of final blow and finish cooling air through respective first and second solenoid valves in accordance with another aspect of the invention includes detecting timing of electrical valve control signals applied to the first and second solenoid valves, and detecting timing of application of air by the first and second solenoid valves responsive to the valve control signals. The timings so detected are compared with each other, and operating condition of the valves is indicated as a function of such comparison.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
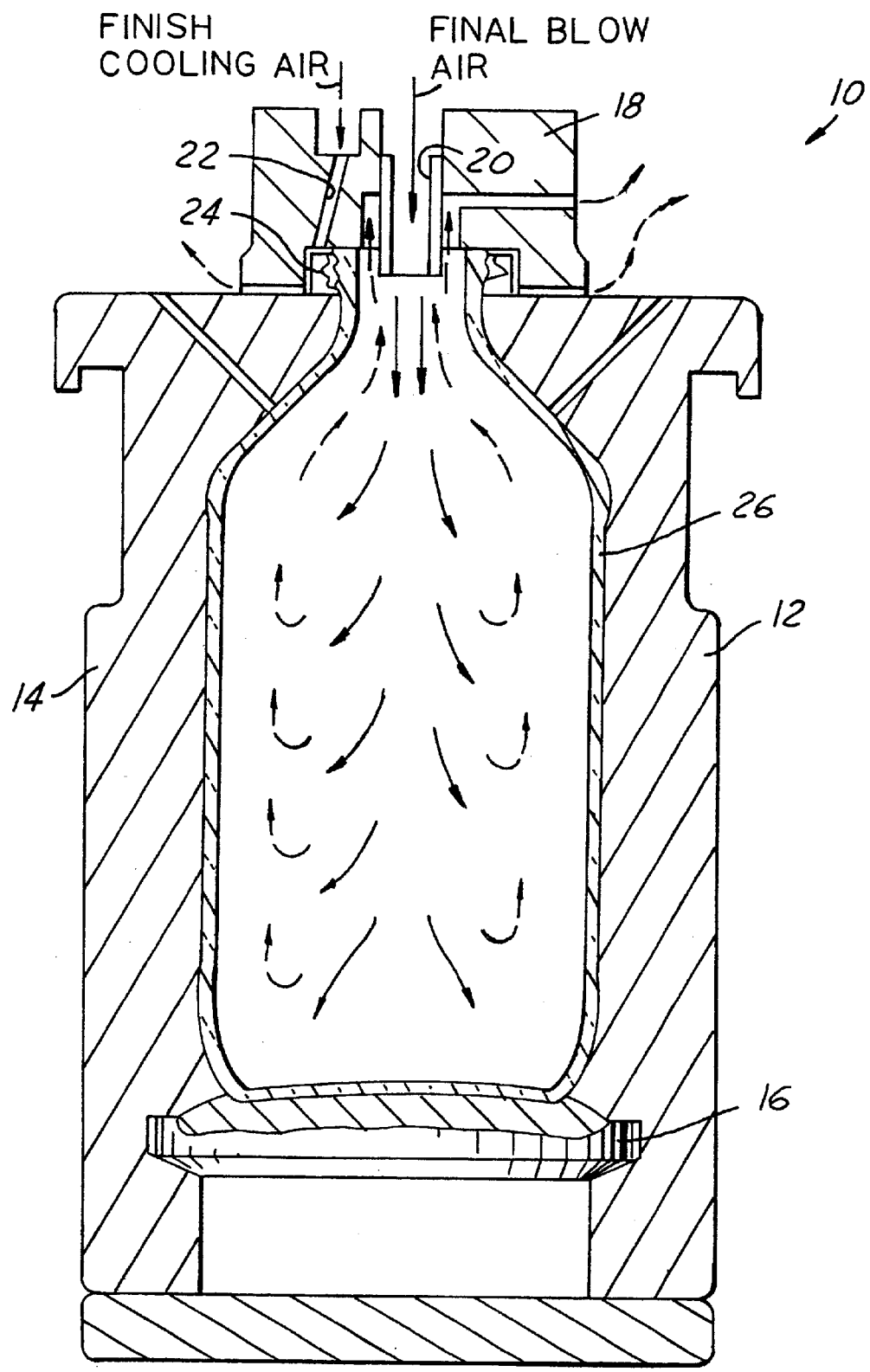
FIG. 1 is a partially sectioned elevational view of a final blow mold in a glassware manufacturing system illustrating application of final blow air and finish cooling air to the parison in the mold.

FIG. 1 illustrates one final blow stage 10 of a section in an individual section glassware forming machine. Each section of the machine includes one or more final blow stages 10, and each section of the machine is identical to the others. An exemplary individual section machine is illustrated in U.S. Pat. No. 5,580,366, the disclosure of which is incorporated herein by reference. Final blow stage 10 illustrated in FIG. 1 includes a pair of blow mold halves 12, 14 that are operated by means not shown to cooperate with each other and with a bottom mold element 16 to form a final blow mold cavity. A dual-stage blowhead 18 has a central passage 20 for applying final blow air to the inside of a parison 26 disposed in the blow mold, and a second passage 22 for applying finish cooling air around the exterior of the finish 24 of the container/parison 26 being formed in mold 12, 14, 16. The mold apparatus illustrated in FIG. 1 is of conventional construction, and is provided by way of background for discussion of the invention as illustrated in FIG. 2.

Figure 2:
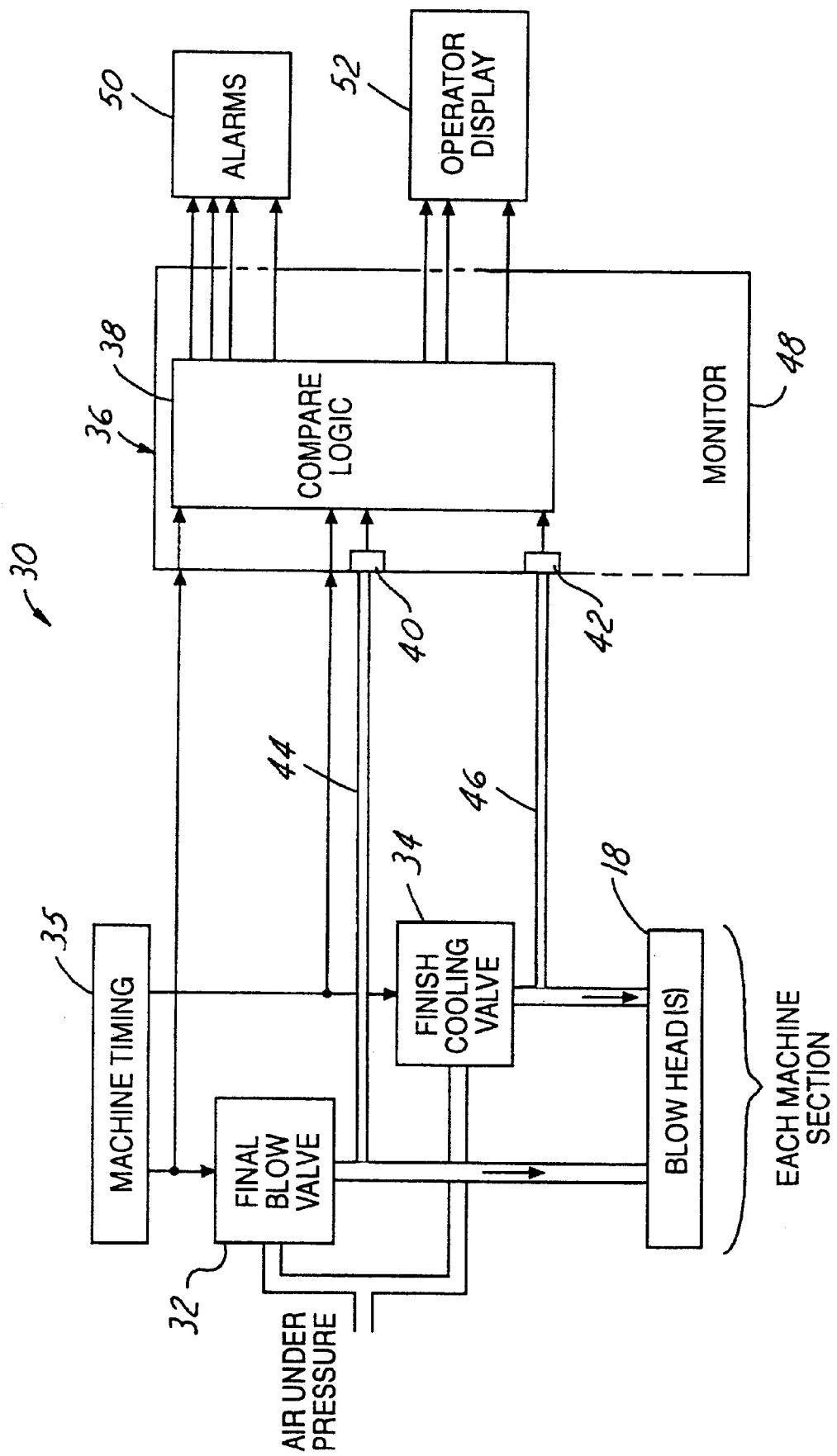
FIG. 2 is a functional block diagram of apparatus in accordance with a presently preferred embodiment of the invention for monitoring application of final blow air and finish cooling air to the mold and parison in FIG. 1.

FIG. 2 illustrates an apparatus 30 for monitoring application of air to blow mold stage 10 of FIG. 1. A final blow solenoid valve 32 and a finish cooling solenoid valve 34 receive respective valve control signals from machine timing electronics 35. Such machine timing electronics are illustrated, for example, in above-referenced U.S. Pat. No. 5,580,366. Final blow valve 32 and finish cooling valve 34 also receive air under pressure from a suitable air source, and are responsive to the respective valve control signals from machine timing electronics 35 for applying final blow air and finish cooling air to the blowhead(s) 18 of each machine section. Each machine section includes one final blow valve 32 and one finish cooling valve 34, and one or more blowheads 18 depending upon the number of containers being manufactured simultaneously within each section. For example, a single-gob machine will have one blow head 18 and one blow mold 12–16 for each machine section, a dual-gob machine will have two blowheads 18 for each machine section, a triple-gob machine will have three blowheads 18 for each machine section, etc.

An electronic monitor 36 is provided for monitoring application of air through valves 32, 34. Monitor 36 includes compare logic 38 operatively coupled to each solenoid valve 32, 34 for receiving signals indicative of application of the valve control signals to the respective valves. Compare logic 38 may comprise individual timers and comparators, for example, or more preferably is microprocessor-based. Monitor 36 is connected to all sections of the forming machine, of which only one section is illustrated in FIG. 2. The valve control signals applied to valves 32, 34 may comprise on/off signals or pulse width modulated valve control signals. Monitor 36 also includes a pair of air pressure sensors 40, 42 that are operatively coupled by associated small-diameter conduits 44, 46 to the outputs of valves 32, 34. Thus, sensors 40, 42 provide to control logic 38 associated electrical sensor signals indicative of the timing of application of air by valves 32, 34 to blowhead(s) 18. Sensors 42, 44 are preferably mounted on a panel of an enclosure 48, within which compare logic 38 is disposed.

Thus, compare logic 38 receives electrical signals indicative of the timing of the valve control signals applied to valves 32, 34 by machine timing electronics 35, and receives sensor signals from sensors 40, 42 indicative of the timing of actual application of air by the respective solenoid valves to blowhead(s) 18. Compare logic 38 preferably is programmed to detect abnormal operation at valves 32, 34, including failure of final blow air or finish cooling air to come on at all following application of the associated valve control signals, late application of final blow or finish cooling air following the associated valve control signals, failure of final blow or finish cooling air to terminate following termination of the associated valve control signals, and late termination of final blow or finish cooling air after termination of the valve control signals. Compare logic 38 monitors each valve control signal and associated sensor signal, determines a difference in timing between the valve control signal and the associated sensor signal, compares such timing difference to a threshold associated with normal valve operation (turn-on or turn-off), and indicates operating condition of the valves as a function of such comparison. Compare logic 38 may energize alarms 50 associated with each machine section for indicating malfunction or impending malfunction at the final blow or finish cooling valves associated with that section, or may provide timing information to an operator display 52 for monitoring by the operator. In this way, gradual deterioration of a solenoid valve can be detected and corrected before complete failure occurs.

There have thus been disclosed an apparatus and method for monitoring application of air to a container blow mold that fully satisfy all of the objects and aims previously set forth. Although the invention has been disclosed in conjunction with a presently preferred embodiment for applying air under pressure, it will be appreciated that the invention in its broadest aspects also encompasses application of air at sub-atmospheric pressure (i.e., vacuum functions such as mold vacuum). The invention has been disclosed in conjunction with a presently preferred embodiment thereof, and a number of modifications and variations have been suggested. Other modifications and variations will suggest themselves to persons of ordinary skill in the art. The invention is intended to embrace all such modifications and variations as fall within the spirit and broad scope of the appended claims.

What is claimed is:

1. Apparatus for monitoring application of air to blow mold a container, having a body formed in a blow mold and a finish, through a dual-stage blowhead, a first solenoid valve for applying final blow air through the blowhead to a container in the mold and a second solenoid valve for applying finish cooling air through the blowhead around the finish of the container in the mold, each of said first and second solenoid valves being responsive to associated first and second electrical valve control signals for applying air through said blowhead, said apparatus comprising:

means coupled to said first and second solenoid valves for detecting timing of application of said first and second electrical valve control signals to said valves, first and second air pressure sensors respectively operatively coupled to said first and second solenoid valves for generating associated first and second electrical sensor signals indicative of timing of application of air by said first and second solenoid valves to said blowhead, and means responsive to timing of said first and second valve control signals and said first and second sensor signals for indicating operating condition of said valves.

2. The apparatus set forth in claim 1 wherein said means for indicating operating condition of said valves comprises electronic compare logic for comparing timing of said valve control signals to timing of said sensor signals to indicate malfunction at said valves.

3. The apparatus set forth in claim 2 wherein malfunction at said valves includes failure of one or both of said valves to apply air responsive to said control signals, late operation of one or both of said valves to apply air responsive to said control signals, failure of one or both of said valves to terminate application of air responsive to said control signals, and late operation of one or both of said valves to terminate application of air responsive to said control signals.

4. The apparatus set forth in claim 2 wherein said compare logic and said sensors are disposed in an enclosure, and wherein said apparatus further includes air conduits for operatively connecting each of said sensors to its associated valve.

5. The apparatus set forth in claim 4 for monitoring application of air to blow molds of an individual section machine having a plurality of sections, each of which includes one each of said first and second valves and at least one blowhead, said apparatus comprising a plurality of said means coupled to the first and second solenoid valves of each machine section, and a plurality of each of said first and second air pressure sensors each operatively coupled to an associated valve of one of said machine sections.

6. A method of monitoring application of air to blow mold a container, having a body formed in a blow mold and a finish, through a dual-stage blowhead, a first solenoid valve for applying final blow air through the blowhead to a container in the mold and a second solenoid valve for applying finish cooling air through the blowhead around the finish of the container in the mold, each of said first and second solenoid valves being responsive to associated first and second electrical valve control signals for applying air through said blowhead, said method comprising the steps of:

(a) detecting timing of application of the electrical valve control signals to said first and second solenoid valves, (b) detecting timing of application of air by said first and second solenoid valves through said dual-stage blowhead responsive to said valve control signals, (c) comparing timing detected in said step (a) with timing detected in said step (b), and (d) indicating operating condition of said valves as a function of the comparison of said step (c).

* * * * *